United States Patent
Rao et al.

(10) Patent No.: US 7,472,380 B1
(45) Date of Patent: Dec. 30, 2008

(54) PROCESSING SYSTEM WITH COMPONENT ARCHITECTURE PLATFORM SUPPORT

(75) Inventors: Bindu Rama Rao, Laguna Niguel, CA (US); Patrick C. Lilley, Irvine, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 10/654,412

(22) Filed: Sep. 3, 2003

Related U.S. Application Data

(60) Provisional application No. 60/412,858, filed on Sep. 23, 2002.

(51) Int. Cl.
*G06F 9/45* (2006.01)
(52) U.S. Cl. ...................................... 717/140
(58) Field of Classification Search ................ 717/168, 717/140; 713/100
See application file for complete search history.

(56) References Cited

U.S. PATENT DOCUMENTS

| | | | |
|---|---|---|---|
| 5,261,055 A | 11/1993 | Moran et al. | 395/275 |
| 5,442,771 A | 8/1995 | Filepp et al. | 395/650 |
| 5,479,637 A | 12/1995 | Lisimaque et al. | 395/430 |
| 5,579,522 A | 11/1996 | Christeson et al. | 395/652 |
| 5,596,738 A | 1/1997 | Pope | 395/430 |
| 5,598,534 A | 1/1997 | Haas | 395/200.09 |
| 5,608,910 A | 3/1997 | Shimakura | 395/670 |
| 5,623,604 A | 4/1997 | Russell et al. | 395/200.1 |
| 5,666,293 A | 9/1997 | Metz et al. | 395/200.5 |
| 5,752,039 A | 5/1998 | Tanimura | 395/712 |
| 5,778,440 A | 7/1998 | Yiu et al. | 711/154 |
| 5,790,974 A | 8/1998 | Tognazzini | 701/204 |
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,279,153 B1 | 8/2001 | Bi et al. | 717/11 |
| 6,311,322 B1 | 10/2001 | Ikeda et al. | 717/1 |

(Continued)

FOREIGN PATENT DOCUMENTS

CA    2339923    3/2000

(Continued)

*Primary Examiner*—John Chavis

(57) ABSTRACT

Disclosed herein is an embedded system having a processor and at least one reference lookup table. The embedded system may be capable of supporting a component architecture platform (CAP) framework and providing a mechanism to resolve references for modules and operands at runtime. The embedded system facilitates update of firmware, drivers and application software in embedded systems such as mobile electronic devices. The system also facilitates generation of compact update packages for the embedded system. Replacement of modules is efficiently handled because at least one reference lookup table provides a needed level of indirection.

20 Claims, 3 Drawing Sheets

U.S. PATENT DOCUMENTS

| | | | |
|---|---|---|---|
| 6,438,585 B2 | 8/2002 | Mousseau et al. | 709/206 |
| 6,574,657 B1 * | 6/2003 | Dickinson | 709/203 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0114384 A1 * | 8/2002 | Nelson et al. | 375/222 |
| 2002/0116261 A1 | 8/2002 | Moskowitz et al. | 705/14 |
| 2002/0131404 A1 | 9/2002 | Mehta et al. | 370/352 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, jR. | 717/178 |
| 2003/0033599 A1 | 2/2003 | Rajaram et al. | 717/173 |
| 2003/0037075 A1 | 2/2003 | Hannigan et al. | 707/500 |
| 2003/0061384 A1 | 3/2003 | Nakatani | 709/245 |
| 2003/0131226 A1 * | 7/2003 | Spencer et al. | 713/100 |
| 2003/0177485 A1 * | 9/2003 | Waldin et al. | 717/169 |
| 2004/0031029 A1 * | 2/2004 | Lee et al. | 717/171 |
| 2004/0040020 A1 * | 2/2004 | Yang | 717/168 |
| 2004/0093597 A1 * | 5/2004 | Rao et al. | 717/171 |
| 2004/0250245 A1 * | 12/2004 | Rao et al. | 717/168 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |

* cited by examiner

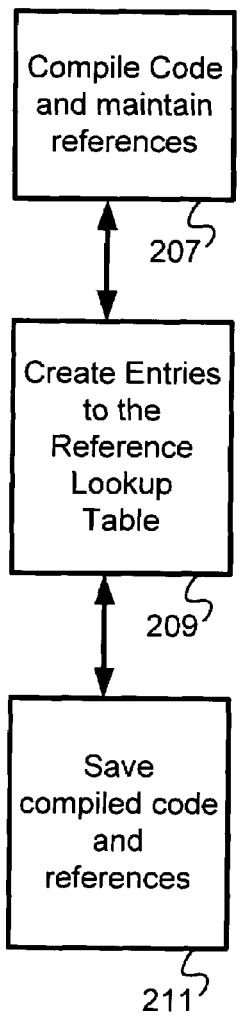
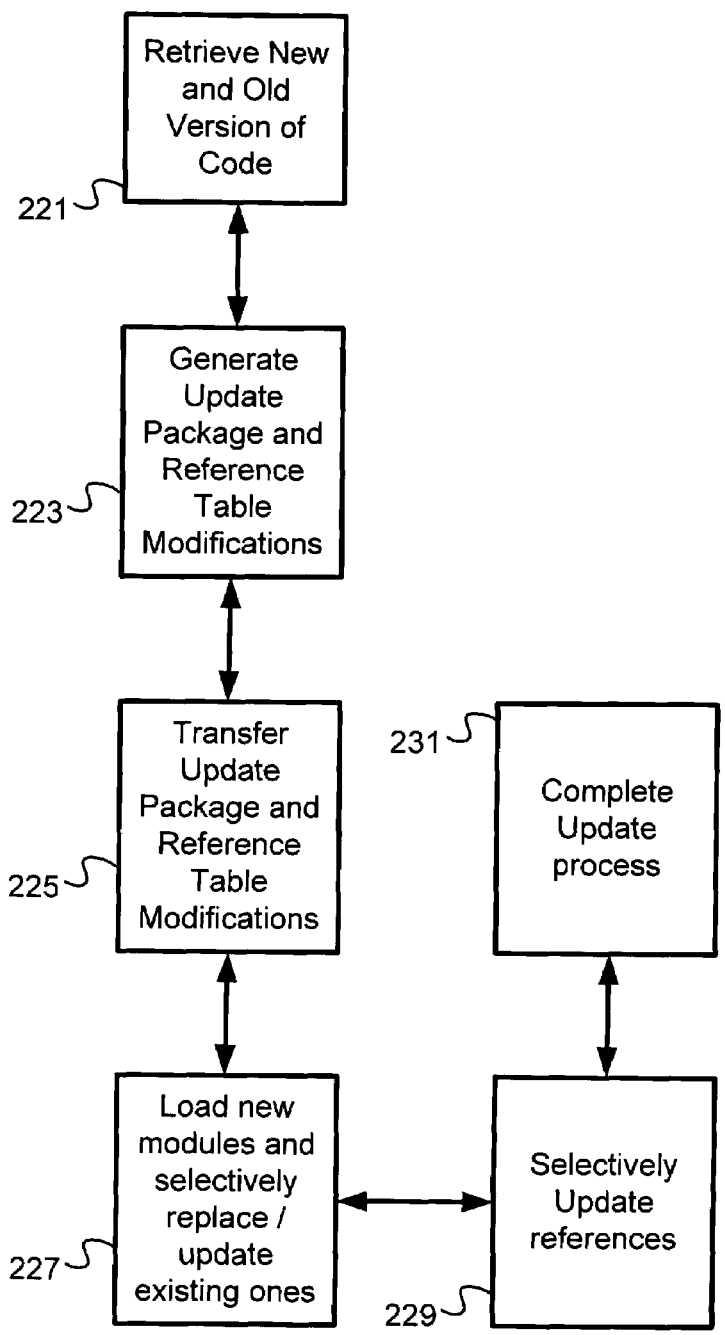
Figure 2A
Figure 2B

PROCESSING SYSTEM WITH COMPONENT ARCHITECTURE PLATFORM SUPPORT

CROSS-REFERENCE TO RELATED APPLICATIONS/INCORPORATION BY REFERENCE

The present application makes reference to, claims priority to, and claims the benefit of U.S. Provisional Application Ser. No. 60/412,858 filed on 23 Sep. 2002, the complete subject matter of which is hereby incorporated herein by reference in its entirety.

The present application also hereby incorporates herein by reference in its entirety, co-pending U.S. application Ser. No. 10/654,149 entitled "EMBEDDED SYSTEM EMPLOYING COMPONENT ARCHITECTURE PLATFORM", filed 3 Sep. 2003.

FEDERALLY SPONSORED RESEARCH OR DEVELOPMENT

Not Applicable

MICROFICHE/COPYRIGHT REFERENCE

Not Applicable

BACKGROUND OF THE INVENTION

Embedded systems (i.e., mobile electronic devices having embedded software/firmware), such as mobile cellular phones, personal digital assistants (PDA's), MP3 players, digital cameras, etc. often contain firmware and/or application software that is either provided by the manufacturers of the electronic devices, telecommunication carriers, or third parties. Mobile electronic devices may be embedded systems because the firmware and application software that they contain may be embedded in silicon memory, such as FLASH. However, firmware and/or application software often contain software bugs. New versions of the firmware and software are periodically released to fix the bugs, introduce new features, or both.

A fundamental problem in providing access to new releases of firmware and software is that the embedded systems (mobile electronic devices) are often constrained in terms of resources, such as available memory. Attempts to upgrade firmware or software by end-users often results in making the device, or some features of the device inoperable. Additionally, when changes to a firmware component, such as a driver, need to be made, there is no easy way to swap the old one out and put in a new one. Typically, the device has to be reflashed by a new FLASH image that is created by recompiling all or most of the code and/or rebuilding the image file. It can be seen that there is a need for an architecture where such recompilation or rebuilding is either made unnecessary or minimized and simplified.

When a new version of a driver or a function is to be introduced into embedded systems, all references to the old driver or function that occur in all other software/firmware sections have to be changed. Similarly, when a data item is shifted around in the memory of an embedded device, all references to that particular data item need to be updated. These are at least two issues that must be faced by embedded system designers.

In current embedded system technology, for example in mobile electronic devices, firmware is one big mass making it very hard to manipulate or update individual functions or sections independently. It can be seen that there is a need for a next generation architecture that enables updates of independent components within mobile electronic devices having embedded systems.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a method and apparatus for designing modular components for software and firmware employed in embedded systems. Aspects of the present invention also provide a method and system for generating, distributing and applying update packages for modular, componentized firmware/software upgrades in embedded systems.

A method according to an embodiment of the present invention comprises a method of compiling code executable in an electronic device having a component architecture platform (CAP) framework. The method comprises compiling code targeted to the CAP framework, creating a reference lookup table, and saving compiled code and the reference lookup table.

In yet another embodiment of the present invention compiling code comprises generating program instructions that use symbolic references for at least one of program variables, functions, methods, and operands, and extracting reference information and populating the reference lookup table with extracted reference information.

In another embodiment of the present invention creating a reference lookup table comprises associating at least one symbolic reference with a physical address, and maintaining the reference information in entries. The entries map symbolic references encountered in the code during compilation to memory addresses.

In another embodiment of the present invention the entries comprise address values assigned to references corresponding to one of a compiler phase and a link/load phase of the compilation.

In another embodiment of the present invention the method further comprises generating one of binary and hex output for compiled code that create entries corresponding to at least one entry in the reference lookup table.

In another embodiment of the present invention the compiled code is adapted for executing individual program instructions and the individual program instructions are pre-fetched into a pipeline of instructions in preparation for execution.

In another embodiment of the present invention processing time is reduced by resolving references via a reference lookup table management unit, and the unit facilitates resolution of the references for pre-fetching instructions into the pipeline.

Another method according to an embodiment of the present invention comprises a method of generating update packages for updating software in a mobile electronic device capable of employing the component architecture platform (CAP) framework. The method comprises retrieving an existing and an updated version of code, determining which program components to modify, generating an update package having modules corresponding to those program components to be modified and generating an associated reference lookup table having entries corresponding to those program components to be modified.

In another embodiment of the present invention determining which program components to modify comprises determining program components to be one of left unchanged, deleted, added, and modified. Program components left unchanged are not included in the update package.

In another embodiment of the present invention the update package and the associated reference lookup table modifications are adapted for transfer to an embedded system in the electronic device as one of a single program unit and two different related program units transferred when the electronic device is updated.

In another embodiment of the present invention the update package is adapted to facilitate update by an update agent in the electronic device.

In another embodiment of the present invention the update package comprises information for adding new modules. The update package replacing existing modules with new modules and updating the associated reference lookup table.

A method in accordance with an embodiment of the present invention comprises a method of operating a processor supporting a component architecture platform (CAP) framework. The method comprises determining an initial processor execution mode, setting the initial processor execution mode, executing program instructions, and communicating with a reference lookup table management unit.

In another embodiment of the present invention the method further comprises looking up additional references, and populating a pipeline with at least one of program instructions, references, and addresses.

In another embodiment of the present invention the method further comprises initializing a reference lookup table with symbolic reference values to be resolved, and retrieving addresses for information corresponding to the symbolic reference values.

A device in accordance with an embodiment of the present invention comprises a mobile electronic device having an embedded system capable of employing a component architecture platform (CAP) framework. The device comprises a processor, a reference lookup table management unit, primary memory and secondary memory, and at least one reference lookup table.

In another embodiment of the present invention the device further comprises non-volatile memory, volatile memory, and software resident in at least a portion of primary and secondary memory.

In another embodiment of the present invention the processor executes program instructions retrieved from at least one of primary and secondary memory.

In another embodiment of the present invention executing a program instruction comprises performing at least one reference lookup, the at least one reference lookup using symbolic names for one of operands, modules, method names, functions, and components, and the at least one reference lookup may be resolvable into an address at program runtime.

In another embodiment of the present invention at least one of primary and secondary memory comprises FLASH memory.

In another embodiment of the present invention the at least one reference lookup table comprises a local reference lookup table mapping at least one of local variables, functions, and methods.

In another embodiment of the present invention modifications to program instructions are reflected and recorded in the local reference lookup table.

In another embodiment of the present invention modifications reflected in the local reference lookup table are also reflected in an non-local reference lookup table.

Another aspect of the present invention comprises a computing environment with a processor capable of executing program instructions from a pipeline. The environment comprises a reference lookup table that is capable of being populated with symbolic references and corresponding location values and a reference lookup table management unit that is capable of managing the reference lookup table and resolving symbolic references in the program instructions into location values before population into the pipeline. The processor is capable of retrieving the program instructions and resolved symbolic references and executing the program instructions.

In another embodiment of the present invention location values in the reference lookup table are one of memory addresses and offsets.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DIAGRAMS

FIG. 2A illustrates a flow chart of compiler activities for compiling code that may be executed in an embedded system with CAP architecture according to an embodiment of the present invention;

Figure 3:
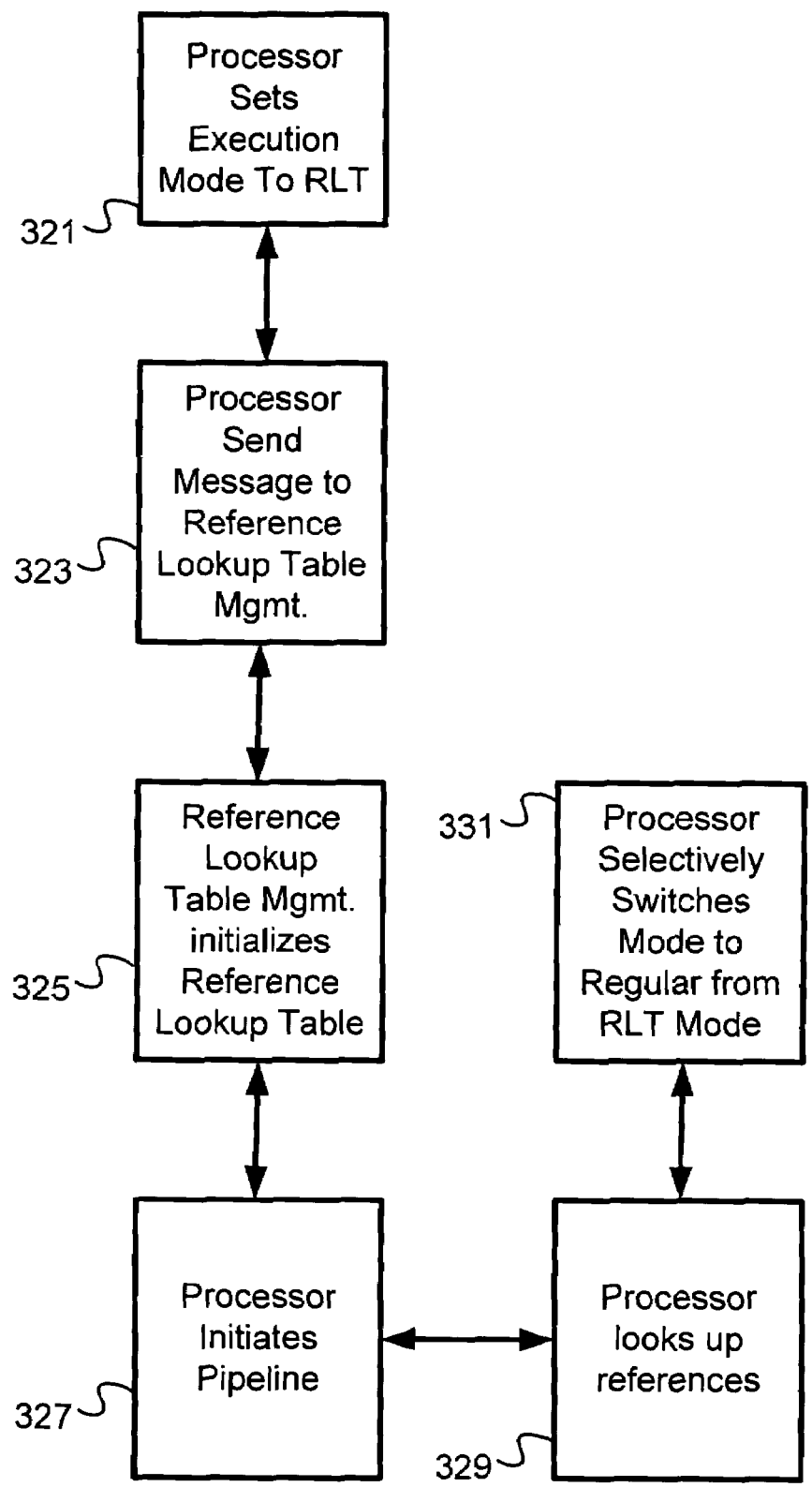

FIG. 2B illustrates a flow chart of a process for generating update packages for updating firmware/software in an embedded system capable of employing CAP architecture from one version to another version according to an embodiment of the present invention; and FIG. 3 illustrates an execution model for a processor in an embedded system capable of executing plural modes and resolving symbolic references in instructions at runtime into addresses of modules according to an embodiment of the present invention.

DETAILED DESCRIPTION OF THE INVENTION

In the following description of the present invention, reference is made to the accompanying drawings which form a part hereof, and in which is shown by way of illustration an embodiment in which the invention may be practiced. It is to be understood that other embodiments may be utilized as structural changes may be made without departing from the scope of the invention.

Aspects of the present invention provide a method and apparatus for designing modular components for software and firmware employed in embedded systems. Aspects of the present invention also provide a method and system for generating, distributing, and applying update packages for modular, componentized firmware/software upgrades in embedded systems.

Figure 1:
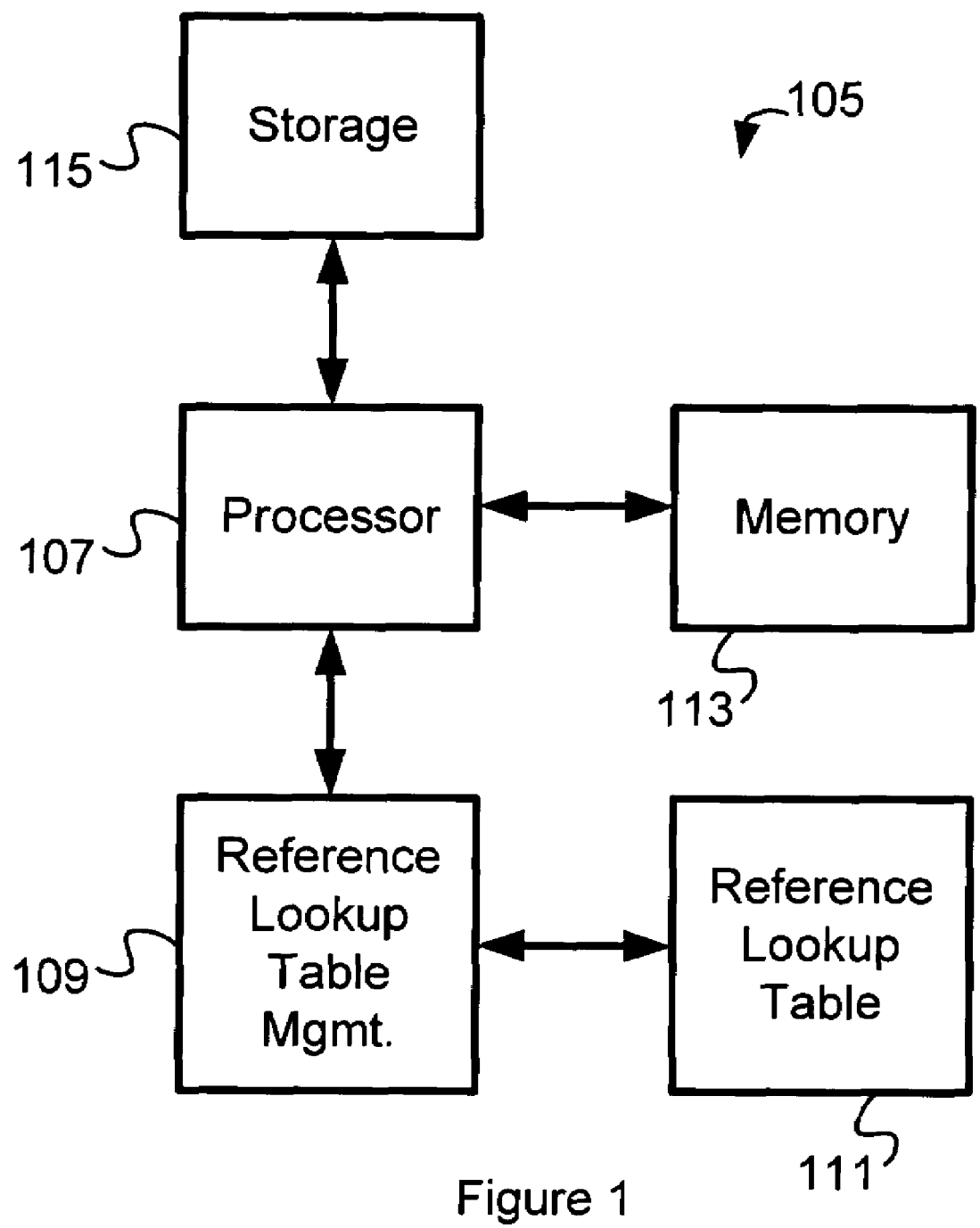
FIG. 1 illustrates block diagram of an embedded system employing component architecture platform (CAP) framework that facilitates easier updates of embedded system software, such as firmware or applications in an electronic device (cellular phones, PDA's, etc.) according to an embodiment of the present invention.

FIG. 1 is a block diagram of an embedded system 105, employing, for example, a component architecture platform (CAP) framework, that comprises a processor 107, reference lookup table management unit 109, primary memory 113, reference lookup table 111, and secondary memory storage 115, in accordance with the present invention. In FIG. 1, embedded system 105 facilitates easier updates of embedded system software, such as firmware or applications in a mobile electronic device.

In one embodiment, the embedded system 105 employing a component architecture platform (CAP) framework comprises at least one reference lookup table, non-volatile memory (such as FLASH) in a primary memory 113, volatile memory (such as RAM), software resident in memory, and secondary memory storage 115. The processor 107 executes program instructions that may be retrieved from primary memory 113 or a secondary memory 115, and the program instructions may require reference lookups. A component architecture platform supports replacement, addition, or deletion of software function, by using symbolic rather than physical memory addresses in program instructions. The symbolic addresses are resolved at runtime to physical memory addresses using a reference lookup table.

The resolution of symbolic addresses to physical memory addresses may be performed in a reference lookup table management unit. The reference lookup table management unit may provide to the associated processor the physical memory address corresponding to a symbolic address contained in a program instruction. The reference lookup table management unit may be implemented within a processor (hardware) or in code (software).

In general, references are symbolic names for operands, modules, method names, functions, components, etc. that need a runtime lookup to be resolved into addresses. Addresses for references may be absolute or relative. The ability to look up addresses at runtime provides flexibility to relocate associated modules/functions/components, etc. In general, it may be assumed that invocation of branch-link instructions, jump commands, subroutine calls, and etc. will be preceded by look up of an address from a reference lookup table.

In another embodiment, a process of loading a new module/function/component into an image of an embedded system is accompanied by activities which may update a reference lookup table, such as reference lookup table 111, with appropriate values for addresses of new or modified functions/components/modules, etc.

In another embodiment, every module (component/function/method, etc.) may maintain a local reference lookup table, such as reference lookup table 111, that provides mapping of local (internal) variables, functions, and methods. When a new module is inserted into an embedded system, a local reference lookup table may also be inserted. Subsequent modifications to a module may be accompanied by changes to the local reference lookup table, in addition to updates to an overall reference lookup table that maintains non-local reference lookup information.

In another embodiment of the present invention, an embedded system 105 may employ chipsets that facilitate maintenance and management of reference lookup tables. The chipsets, such as reference lookup table management unit 109, may employ micro-coding techniques to implement reference table lookups, reference table management, and access to references during execution of code at runtime. Software development tools such as compilers that compile applications, may generate binary or hex output for compiled code that create entries to the reference lookup tables, and may also manipulate tables, such as reference lookup table 111.

FIG. 2A illustrates a flow chart of compiler activities for compiling code that may be executed in an embedded system having the CAP architecture. At block 207, a compiler compiles code targeted to the CAP architecture. This may involve extracting reference information and maintaining the reference information. Later, at block 209, a reference lookup table may be created and populated with entries of extracted reference information. The entries may be a map of symbolic names of references encountered in the code during compilation, and address values (relative or absolute) that may be assigned to entries in a compiler phase or in a subsequent link/load phase (when the references may be loaded into memory for execution). At block 211, the compiled code may be saved along with an associated reference lookup table.

Actual compiling activity may be executed by the embedded system or by another system that targets the embedded system for execution. The compiled code may be executed in an embedded system. The processor may execute the code by retrieving and executing individual program instructions, often in a specific order. The program instructions may be retrieved ahead of an execution order and a pipeline of instructions may be maintained, with references for the pipeline of instructions resolved into addresses or other values in preparation for execution of the instructions.

By pre-fetching instructions into a pipeline of instructions and by resolving references before it is time to execute the instructions, the processor may avoid spending additional time in resolving addresses or values associated with the references. The reference lookup table management unit 109 may facilitate resolution of the references for program instructions in the pipeline.

FIG. 2B illustrates an exemplary process of generating update packages for updating firmware/software in an embedded system from one version to another version and a process of retrieving and updating the embedded system, in accordance with an embodiment of the present invention. The embedded system may employ a CAP architecture. At block 221, new and old versions of code, such as a collection of code loaded into an embedded system, may be retrieved by a generator environment, for example. The generator environment may determine what modules/component/functions may be added, deleted, or modified between the old and the new versions. Only modules that are added, deleted, or modified may be considered as candidates for inclusion in an update package.

At block 223, an update package may be generated and reference lookup table modifications may be determined. Modifications to the reference lookup table may be associated with modules/components/functions that are added, deleted, or modified between the old and new versions.

At block 225, an update package may be transferred to the embedded system along with associated reference lookup table modifications. In one embodiment, the update package may comprise the reference lookup table modifications. In another related embodiment, reference lookup table modifications and the update package may be treated as two different but related units of data to be transferred to the embedded system.

At block 227, the update agent in the embedded system processes the retrieved update package and associated reference lookup table modifications. The embedded system loads new modules (methods, functions, subroutines, classes, etc.) if any, for the new version of the embedded system being in the update package. The new modules replace existing modules in the embedded system. The update agent in the embedded system also applies modifications to those modules that are to be modified but not replaced. These activities may be only part of an update process facilitated by an update agent in an embedded system.

References to newly added modules, modified modules, or deleted modules may be updated in a reference lookup table at block 229. Processing stops at block 231 when the update process is completed.

FIG. 3 illustrates an execution model for an exemplary processor, such as processor 107 of embedded system 105, in accordance with an embodiment of the present invention. The processor may execute in one of at least two modes: a reference lookup table (RLT) mode, where the processor may resolve at runtime symbolic references in instructions into addresses of modules or operands, etc.; and a regular mode, where the processor may execute program instructions in which references have already been resolved, and for which a reference lookup table is not employed.

At block 321, the processor may determine whether to execute program instructions in RLT mode and may set the execution mode to RLT, if not yet set. At block 323, the processor may send a message to a reference lookup table management unit, such as reference lookup management unit 109 disclosed in FIG. 1, to indicate whether to lookup addresses/values for symbolic references in program instructions. The reference lookup table management unit may initialize the reference lookup table, if necessary, with name/value pairs and other related information, wherein each name may be a symbolic reference to be resolved in a current program context.

At block 327, the processor may initiate a pipeline of program instructions to be executed and reference lookup table management unit may be employed to retrieve addresses for all references and populate the references into the pipeline to prepare the pipelined instructions for execution by the processor.

At block 329, the processor may look up any additional references that may not yet have been resolved and may retrieve addresses or values for the additional references. At the conclusion of execution of program instructions within the current program context, the processor may switch modes to regular execution mode from RLT mode.

Although a system and method according to the present invention has been described in connection with a preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams.

What is claimed is:

1. A method of generating update packages for updating software in a mobile electronic device, the method comprising:
retrieving an existing version of code and a corresponding updated version of the code, the existing and the updated versions of code comprising program components each comprising a plurality of program instructions;
determining which program components in the existing version of code to modify, using the existing version of code and the updated version of code;
generating an update package having modules corresponding to those program components to be modified;
generating an associated reference lookup table having entries corresponding to those program components to be modified, each entry associating a symbolic reference in the undated version of code with a memory address in the mobile electronic device; and
communicating the reference lookup table to the mobile electronic device, to enable the mobile electronic device to resolve the symbolic references in the program instruction to a memory address in the mobile electronic device, during program instruction execution.

2. The method according to claim 1, wherein determining which program components to modify comprises determining program components to be one of left unchanged, deleted, added, and modified, and wherein program components left unchanged are not included in the update package.

3. The method according to claim 1, wherein the update package and the associated reference lookup table modifications are adapted for transfer to an embedded system in the electronic device as one of a single program unit and two different related program units transferred when the electronic device is updated.

4. The method of claim 1, wherein the update package is adapted to facilitate update by an update agent in the electronic device.

5. The method of claim 1, wherein the update package comprises information for adding new modules, and further comprising:
replacing existing modules with new modules; and
updating the associated reference lookup table.

6. A mobile electronic device comprising:
a processor for executing program instructions resident in one or both of primary memory and secondary memory in the mobile electronic device;
a reference lookup table management unit employed by the processor to, at least, resolve a symbolic reference in a program instruction to a memory address in the one or both of primary memory and secondary memory, during program instruction execution;
and
at least one reference lookup table resident in memory accessible by the reference lookup table management unit, the at least one reference lookup table comprising one or more entries each associating a symbolic reference representing a location within a program component, to a memory address in the one or both of primary memory and secondary memory.

7. The device according to claim 6, further comprising:
non-volatile memory;
volatile memory; and
software resident in at least a portion of one or both of primary and secondary memory.

8. The device according to claim 6, wherein the processor retrieves program instructions, resolves symbolic references employing the at least one reference lookup table and executes program instructions retrieved from the one or both of primary and secondary memory.

9. The device according to claim 8, wherein executing a program instruction comprises performing at least one reference lookup, the at least one reference lookup using symbolic names for one of operands, modules, method names, functions, and components, and wherein the at least one reference lookup may be resolvable into an address at program runtime.

10. The device according to claim 6, wherein the one or both of primary and secondary memory comprises FLASH memory.

11. The device according to claim 6, wherein the at least one reference lookup table comprises a local reference lookup table mapping at least one of local variables, functions, and methods.

12. The device according to claim 11, wherein modifications to program instructions are reflected and recorded in the local reference lookup table.

13. The device according to claim 12, wherein modifications reflected in the local reference lookup table are also reflected in a non-local reference lookup table.

14. A computing system comprising:
a processor executing program instructions from a pipeline, the processor comprising:
- storage having resident therein a reference lookup table populated with symbolic references and corresponding program memory location values; and
- a reference lookup table management unit that manages the reference lookup table, and resolves symbolic references in the program instructions into program memory location values before population into the pipeline, wherein the processor retrieves the program instructions and resolved symbolic references and executes the program instructions using the program memory location values.

15. The computing system according to claim 14, wherein location values in the reference lookup table are one of memory addresses and offsets.

16. An updateable mobile electronic device employing a component architecture platform (CAP) framework, comprising:
- at least one non-volatile memory for storing one or both of executable code and data;
- firmware resident in the at least one non-volatile memory, the resident firmware arranged in a configuration of one or more updateable independent modular firmware components;
- update agent code in the at least one non-volatile memory, the update agent code, during operation, processing one or more update packages received by the mobile electronic device to produce one or more updated independent modular firmware components for insertion into the resident firmware, the one or more updated independent modular firmware components enabling associated new feature functionality in the updateable mobile electronic device; and
- wherein insertion of the one or more updated independent modular firmware components into a second updateable mobile electronic device having resident firmware enables in the second updateable mobile electronic device the new feature functionality associated with the one or more updated independent modular firmware components.

17. The updateable mobile electronic device of claim 16, wherein any one of the one or more updateable independent modular firmware components is updateable by itself.

18. The updateable mobile electronic device of claim 16, wherein resident firmware in any of a plurality of the updateable mobile electronic devices may be updated using the one or more updated independent modular firmware components, without regard to existing configurations of updateable independent modular firmware components in the plurality of updateable mobile electronic devices.

19. The updateable mobile electronic device of claim 16, wherein executable code instructions use symbolic address references.

20. The updateable mobile electronic device of claim 19, wherein the symbolic addresses are resolved to physical addresses using a reference lookup table.

* * * * *

UNITED STATES PATENT AND TRADEMARK OFFICE
CERTIFICATE OF CORRECTION

PATENT NO. : 7,472,380 B1 Page 1 of 1
APPLICATION NO. : 10/654412
DATED : December 30, 2008
INVENTOR(S) : Bindu Rama Rao et al.

It is certified that error appears in the above-identified patent and that said Letters Patent is hereby corrected as shown below:

In column 7, line 63, in Claim 1, delete "undated" and insert -- updated --, therefor.

Signed and Sealed this

Second Day of June, 2009

JOHN DOLL
*Acting Director of the United States Patent and Trademark Office*